No. 794,481.

Patented July 11, 1905.

UNITED STATES PATENT OFFICE.

DAVID M. BALCH, OF CORONADO, CALIFORNIA, ASSIGNOR OF ONE-HALF TO ANSON P. STEPHENS, OF SAN DIEGO, CALIFORNIA.

PROCESS OF MANUFACTURING FUEL FROM SEAWEEDS.

SPECIFICATION forming part of Letters Patent No. 794,481, dated July 11, 1905.

Application filed January 15, 1904. Serial No. 189,217.

*To all whom it may concern:*

Be it known that I, DAVID M. BALCH, a citizen of the United States, residing at Coronado, in the county of San Diego, State of California, have invented a new and useful Process for the Manufacture of Fuel from Seaweeds, of which the following is a specification.

The large growing fuci and many of the seaweeds contain considerable quantities of combustible material which cannot be utilized as a fuel in their natural state for several reasons, among which are the following: First, their combustion is hampered and checked by the large amount of ash that they produce by burning; second, they diffuse foul odors when kindled owing to the nitrogenous material which they contain. In my improved process I overcome both of these objections and produce a useful and innocuous fuel.

In my process the weeds are gathered and dried by any suitable process, preferably by exposure to the sun and wind. The material thus prepared is coated with some alkaline substance, preferably air-slaked lime, and is then heated in a suitable receptacle, either with or without pressure, until all volatile matter has been driven off and the residue is charred. It is desirable that this volatile matter be collected and utilized, as the same forms a combustible gas; but the collection thereof is no part of this process. The charred residuum is then lixiviated with water, either hot or cold, until the saline constituents thereof are removed therefrom. The lixiviated liquor may be utilized for the production of potassium chlorid, but forms no part of this invention. The lixiviated char is then dried by heat, either natural or artificial, and is then ready for use. It is, however, preferably incorporated with some substance, such as heavy crude petroleum or a liquid resinous solution, to give it coherence, and then formed by pressure into blocks of any desired shape or size. Thus prepared it burns freely, yielding about the same amount of ash as lignite or coke. Thus it will be seen that the lime is very fine powder, and is dusted over the dry seaweed as it lies in the receptacles preparatory to heating, until the surface is well whitened. The amount of lime used may vary with the variety of seaweed treated, but as a general rule need not exceed two per cent. The application or addition of the lime to the seaweed before charring has no effect whatever until the weed is subjected to heat. The presence of the lime during the charring assists in the breaking up of certain difficultly-decomposable nitrogenous constituents of the seaweed and gives a clean and perfect char or residue in condition to yield a colorless saline solution and an unsubjectionable carbon in less time and at a lower temperature than when lime is not present. Thus when lime is not present in the charring the lixiviated saline solution will in all probability be colored and the carbon unclean, both of which results would necessitate refurnacing—an expensive and troublesome operation and nearly tantamount to the entire reworking of the material, a most serious matter when the work is carried forward on a larger scale. Hence the use of lime in the charring is economic of time and fuel and, furthermore, by its use success is assured. The presence of lime in the char subsequent to the charring of the weed has no effect on the saline solution extracted from the char by lixiviation. It may increase the amount of ash yielded by the exhausted char when used as a fuel; but this possible objection is more than counterbalanced by the cleanliness of the char and its freedom from ill-smelling nitrogenous exhalations when burning. Where a very pure fuel is desired, the lixiviated char is further treated in a suitable receptacle with a dilute mineral acid until all soluble parts are removed therefrom. By treating the char with mineral acid magnesium and calcium carbonates and phosphates are removed from the char. The residuum is washed with water and then dried. The result is a very pure carbon and may be used either alone or mixed with some combustible matter that will give it coherence and then formed by pressure into blocks of any desired shape or size. Thus prepared it forms a fuel of great excellence and of great heating power, which burns without odor and with but little ash. The residues of these several operations which are not utilized are converted into material for fertilizers.

Having described my invention, what I claim as new, and desire to secure by Letters Patent, is—

1. The herein-described process of treating seaweed to obtain fuel consisting in drying the weed, then coating the weed with an alkaline substance prior to further treatment, then subjecting the dried and alkaline-coated weed to the indirect action of dry heat immediately subsequent to coating the weed with the alkaline and until the volatile products are driven off and a char results, then lixiviating the charred residuum with water until the saline constituents of the residuum are removed and subsequently drying the residuum.

2. The herein-described process of treating seaweed to obtain fuel consisting in drying the weed, coating the weed with an alkaline substance, subjecting the weed to the action of heat to char the weed, lixiviating the charred residuum, subsequently treating the lixiviated charred residuum with a mineral acid to remove the soluble portions of the residuum subsequent to its subjection to heat, washing the residuum subsequent to its treatment with a mineral acid and then drying the residuum.

3. The herein-described process of treating seaweed to obtain fuel consisting in drying the weed, coating the weed with an alkaline substance previous to its further treatment, applying heat to the coated weed to obtain a charred residuum, lixiviating the charred residuum, drying the charred residuum, and then commingling a combustible agglutinant therewith and molding the mass into suitable forms.

4. The herein-described process of treating seaweed to obtain fuel consisting in coating the weed with an alkaline substance and subsequently thereto, of treating the alkaline-coated weed to obtain a lixiviated charred residuum and then commingling a combustible agglutinant therewith.

In witness that I claim the foregoing I have hereunto subscribed my name this 7th day of January, 1904.

DAVID M. BALCH.

Witnesses:
 WM. HUMPHREY,
 J. L. FREELAND.